(12) United States Patent
Salisbury et al.

(10) Patent No.: US 9,311,244 B2
(45) Date of Patent: Apr. 12, 2016

(54) ENFORCING ORDERING OF SNOOP TRANSACTIONS IN AN INTERCONNECT FOR AN INTEGRATED CIRCUIT

(71) Applicant: ARM LIMITED, Cambridge (GB)

(72) Inventors: Sean James Salisbury, Sheffield (GB); Andrew David Tune, Sheffield (GB); Daniel Sara, Sheffield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/467,469

(22) Filed: Aug. 25, 2014

(65) Prior Publication Data

US 2016/0055085 A1   Feb. 25, 2016

(51) Int. Cl.
*G06F 12/02* (2006.01)
*G06F 12/08* (2006.01)

(52) U.S. Cl.
CPC ...... *G06F 12/0831* (2013.01); *G06F 2212/621* (2013.01)

(58) Field of Classification Search
CPC .................................................. G06F 12/0831
USPC .................. 711/146, 118, 154, 156, 158
See application file for complete search history.

(56) References Cited

U.S. PATENT DOCUMENTS

| 7,127,562 | B2 * | 10/2006 | Dieffenderfer | ..... G06F 12/0831 711/144 |
| 8,667,226 | B2 * | 3/2014 | Moyer | ................ G06F 12/0831 711/146 |
| 8,706,974 | B2 * | 4/2014 | Moyer | ................ G06F 12/0831 711/146 |
| 8,918,591 | B2 * | 12/2014 | Moyer | ................ G06F 12/0831 711/118 |
| 8,935,485 | B2 * | 1/2015 | Jalal | ..................... G06F 12/0815 711/100 |
| 2006/0075169 | A1 | 4/2006 | Harris et al. | |
| 2007/0050465 | A1 * | 3/2007 | Canter | ................... G06Q 20/04 709/209 |
| 2014/0281180 | A1 * | 9/2014 | Tune | ................... G06F 12/0817 711/104 |

* cited by examiner

*Primary Examiner* — Stephen Elmore
(74) *Attorney, Agent, or Firm* — Nixon & Vanderhye P.C.

(57) ABSTRACT

An interconnect has transaction tracking circuitry for enforcing ordering of a set of data access transactions so that they are issued to slave devices in an order in which they are received from master devices. The transaction tracking circuitry is reused for also enforcing ordering of snoop transactions which are triggered by the set of data access transactions, for snooping master devices identified by a snoop filter as holding cache data for the target address of the transactions.

19 Claims, 5 Drawing Sheets

FIG. 1 data access
transactions:

| | | e.g. |
|---|---|---|
| A | transaction ID = 0, master = 1 | B |
| B | transaction ID = 1, master = 1 | A |
| | enforce ordering | |
| C | transaction ID = 0, master = 0 | C |
| | A before D | E |
| D | transaction ID = 0, master = 1 | B before E | D |
| E | transaction ID = 1, master = 1 | | snoops:

| | e.g. |
|---|---|
| A → snoop masters 0,2 | enforce ordering |
| B → snoops master 0 | A snoops 0,2 |
| | B snoop 0 |
| C → no snoops | A snoops before D snoops, |
| | E snoop 0 |
| D → snoop masters 0,2 | D snoop 0,2 |
| | B snoops before E snoops |
| E → snoop master 0 | |

ENFORCING ORDERING OF SNOOP TRANSACTIONS IN AN INTERCONNECT FOR AN INTEGRATED CIRCUIT

BACKGROUND

1. Technical Field

The present technique relates to the field of integrated circuits. More particularly, it relates to handling snoop transactions in an interconnect for connecting devices in an integrated circuit.

2. Technical Background

An interconnect may be used to connect devices in an integrated circuit, and maintain coherency between the devices. When one device issues a data access transaction for a target address, other devices may have cached copies of the data from the target address, so to maintain coherency the interconnect can send snoop transactions to other devices to check the status of the cached copies at other devices, for example to identify the most up to date data value for the target address. A snoop filter may record which master devices have cached data for various addresses. By only sending snoop transactions to the master devices recorded in the snoop filter for a given address, the number of snoop transactions can be reduced. The present technique seeks to reduce the circuit area and performance overhead associated with an interconnect using a snoop filter.

SUMMARY OF THE PRESENT TECHNIQUE

Viewed from one aspect, the present technique provides an interconnect for connecting devices in an integrated circuit, the interconnect comprising:

transaction tracking circuitry capable of tracking data access transactions received by the interconnect from one or more master devices, and for at least one set of data access transactions, controlling issuing of the data access transactions within the same set of data access transactions to one or more slave devices in a selected order; and a snoop filter capable of identifying, in response to a data access transaction specifying a target address, which master devices have cached data for the target address;

wherein the transaction tracking circuitry is capable of controlling issuing of at least one snoop transaction to at least one master device identified by the snoop filter as having cached data for the target address; and for a set of snoop transactions issued in response to data access transactions within the same set of data access transactions, the transaction tracking circuitry is capable of controlling issuing of the set of snoop transactions to the at least one master device in an order corresponding to the selected order of the corresponding set of data access transactions.

Viewed from another aspect, the present technique provides an integrated circuit comprising the interconnect discussed above.

Viewed from another aspect, the present technique provides an interconnect for connecting devices in an integrated circuit, the interconnect comprising:

transaction tracking means for tracking data access transactions received by the interconnect from one or more master devices, and for at least one set of data access transactions, for controlling issuing of the data access transactions within the same set of data access transactions to one or more slave devices in a selected order; and snoop filter means for identifying, in response to a data access transaction specifying a target address, which master devices have cached data for the target address;

wherein the transaction tracking means is capable of controlling issuing of at least one snoop transaction to at least one master device identified by the snoop filter means as having cached data for the target address; and for a set of snoop transactions issued in response to data access transactions within the same set of data access transactions, the transaction tracking means is capable of controlling issuing of the set of snoop transactions to the at least one master device in an order corresponding to the selected order of the corresponding set of data access transactions.

Viewed from a further aspect, the present technique provides transaction tracking circuitry for an interconnect for connecting one or more master devices and one or more slave devices in an integrated circuit, the transaction tracking circuitry comprising:

a snoop filter interface capable of controlling a snoop filter, in response to a data access transaction received from a master device specifying a target address, to identify which master devices have cached data for the target address, and capable of controlling issuing of at least one snoop transaction to at least one master device identified by the snoop filter as having cached data for the target address; and control circuitry capable of controlling an order in which the data access transactions are issued to the one or more slave devices;

wherein for at least one set of data access transactions, the control circuitry is capable of controlling issuing of the data access transactions within the same set of data access transactions to the one or more slave devices in a selected order; and for a set of snoop transactions issued in response to data access transactions within the same set of data access transactions, the control circuitry is capable of controlling issuing of the set of snoop transactions to the at least one master device in an order corresponding to the selected order of the corresponding set of data access transactions.

Another aspect of the present technique comprises an integrated circuit comprising the transaction tracking circuitry.

Viewed from another aspect, the present technique provides transaction tracking circuitry for an interconnect for connecting one or more master devices and one or more slave devices in an integrated circuit, the transaction tracking circuitry comprising:

snoop filter interface means for controlling a snoop filter, in response to a data access transaction received from a master device specifying a target address, to identify which master devices have cached data for the target address, and for controlling issuing of at least one snoop transaction to at least one master device identified by the snoop filter as having cached data for the target address; and control means for controlling an order in which the data access transactions are issued to the one or more slave devices;

wherein for at least one set of data access transactions, the control means is capable of controlling issuing of the data access transactions within the same set of data access transactions to the one or more slave devices in a selected order; and for a set of snoop transactions issued in response to data access transactions within the same set of data access transactions, the control means is capable of controlling issuing of the set of snoop transactions to the at least one master device in an order corresponding to the selected order of the corresponding set of data access transactions.

Viewed from a further aspect, the present technique provides a transaction tracking method for an interconnect in an integrated circuit, the method comprising:

receiving data access transactions from one or more master devices of the integrated circuit;

in response to a data access transaction specifying a target address, controlling a snoop filter to identify which master devices have cached data for the target address using a snoop filter;

controlling issuing of at least one snoop transaction to at least one master device identified by the snoop filter as having cached data for the target address; and controlling issuing of the data access transactions to one or more slave devices;

wherein for at least one set of data access transactions, transaction tracking circuitry controls issuing of the data access transactions within the same set of data access transactions to one or more slave devices in a selected order; and the same transaction tracking circuitry controls issuing of a set of snoop transactions issued in response to data access transactions within the same set of data access transactions so that the set of snoop transactions are issued to the at least one master device in an order corresponding to the selected order of the corresponding set of data access transactions.

Further aspects, features and advantages of the present technique will be apparent from the following description of examples, which is to be read in conjunction with the accompanying drawings.

DESCRIPTION OF EXAMPLES

Some coherency protocols may require that certain sets of data of access transactions are issued by the interconnect to their slave devices in a certain order (referred to below as the "selected order"). The snoop transactions which are issued in response to data access transactions within the same set may therefore also be subject to ordering limitations so that they are issued in an order which corresponds to the selected order of the corresponding set of data transactions.

The inventors of the present technique realised that making the snoop filter responsible for enforcing the order in which snoop transactions are issued may greatly increase the circuit scale of the snoop filter and also reduce snoop filter performance. This is because either the snoop filter would be accessed in order for the respective data access transactions within the same set, which would reduce the ability to use parallel or out-of-order lookup optimisations to improve performance, or if parallel or out-of-order accesses to the snoop filter are permitted then the snoop filter would need a large amount of tracking circuitry for tracking each lookup to enforce the ordering of the resulting snoop transactions.

The inventors realised that the interconnect typically already has transaction tracking circuitry for tracking the data access transactions received from the interconnect from the master devices, and for controlling issuing of data access transactions within the same set of data access transactions to slave devices in the selected order. This transaction tracking circuitry can be reused for enforcing ordering of snoop transactions which are issued to master devices, to reduce the circuit area of the snoop filter and improve snoop filter performance.

This approach is counter-intuitive, since the transaction tracking circuitry in an interconnect is normally used only for transactions to be routed to slave devices, and in contrast snoop transactions would be transmitted to master devices. The inventors realised that the snoop transactions can be treated as another type of data access transaction, with a snoop interface (which outputs the snoop transactions from the interconnect to the master devices) being effectively treated as another slave device. In this way, little modification of the existing transaction tracking circuitry is needed, but this allows a great improvement in the circuit and performance efficiency of the snoop filter.

This approach can be used for enforcing any ordering requirement for a set of data access transactions and the corresponding snoop transactions. However, in some examples the selected order may be the order in which the set of data access transactions are received. Hence, the transaction tracking circuitry may ensure that data access transactions in the same set are issued to the slave devices in the same order as they were received by the interconnect, and that the snoop transactions are handled in a corresponding order. Constraining transactions to be handled in the same order as they were received can be useful for avoiding deadlock situations and for maintaining data coherency, for example.

For example, for a set of data access transactions including a first data access transaction that is received before a second data access transaction, the transaction tracking circuitry may ensure that the corresponding snoop transactions are issued so that any snoop transaction issued in response to the first data access transaction is issued to at least one master device before any snoop transaction issued in response to the second data access transaction of the set. Hence, while snoop transactions may be handled in a different order when they are triggered by data access transactions from different sets or by data access transactions for which there is no strict ordering requirement, when there is a set of data access transactions for which ordering is enforced, a snoop transaction triggered by a later received data access transaction in the ordered set of data access transactions should be prevented from issuing ahead of an earlier received data access transaction from the same set.

In some cases, the snoop filter may comprise a single bank of snoop filter entries recording the devices which have cached data from a given address.

However, the present technique is particularly when the snoop filter comprises multiple snoop filter banks. Multiple banks are useful to allow snoop filter lookups to proceed in parallel, and also because the snoop filter may require more storage locations than can be provided by a single bank. In this case, the snoop filter may be arranged so that the different banks are arranged at the corners of the snoop filter circuit, with control circuitry for accessing the banks provided in a middle part of the snoop filter circuit between the different banks of snoop filter locations. This reduces the maximum circuit path length between the control circuitry and any one bank of snoop filter locations, to reduce latency when accessing the snoop filter. However, this means that the path length between two different banks of snoop filter locations may be increased since the banks may for example be located at opposite corners of the snoop filter circuit. This means that providing tracking circuitry in the snoop filter circuit for tracking the order in which snoop transactions are issued may be harmful for latency, because different banks of the snoop filter would have to communicate with each other to track when each other's snoop transactions have been issued, and the physical distance between the banks would cause increased latency. This problem can be avoided by reusing the transaction tracking circuitry within the interconnect, which normally only handles ordering of data access transactions, so that it also enforces ordering of snoop transactions.

The interconnect may have a snoop interconnect interface which issues the snoop transactions to the master devices. The transaction tracking circuitry may have a slave device interface for issuing the data access transactions to the slave devices, and the snoop transactions may be issued by the transaction tracking circuitry to the snoop interconnect interface via the slave device interface. This may require very little modification of the transaction tracking circuitry since the transaction tracking circuitry may already provide a slave device identifier with each data access transaction to indicate to the slave device interface which slave device is the destination slave device for that transaction. The snoop interconnect interface may be treated as another slave device and allocated a predetermined value for the slave device identifier. The transaction tracking circuitry may generate the snoop transactions having a predetermined value of the slave device identifier, and in response to the predetermined value of the slave device identifier, the slave device interface may issue the snoop transactions to the snoop interconnect interface which may route them on to the appropriate master devices.

Alternatively, rather than sharing the same slave device interface with the data access transactions, a dummy slave device interface may be provided which is dedicated for snoop transactions, with the data access transactions being issued via another slave device interface. Hence, there may be multiple slave interfaces on the transaction tracking logic, where one is the dummy slave device interface which is dedicated for snoop requests, and the transaction tracking may treats the dummy slave device interface as if it is an additional slave device interface, and interact with the dummy slave device interface in the same way as with the normal slave device interface. Again, a slave device identifier may be used to select which slave device interface to use for a given transaction, with snoop transaction requests being allocated a different slave device identifier value to data access transactions so that they are routed to the dummy slave device interface.

There are a number of ways in which the data access transactions of the same set could be identified, to signal that a particular ordering for those transactions is required. In general, the data access transactions may have an associated transaction identifying value, and data access transactions having the same transaction identifying value may be considered to be part of the same set.

For example, the transaction identifying value may identify whether the data access transaction is a predetermined type of transaction. For example, certain types of data access transactions may be constrained to be issued in a given order. In this case, the data access transactions within the same set may simply be the data access transactions of a predetermined type. In another example, the transaction identifying value may be a value identifying which master device issued the transaction, or another parameter which identifies the members of an ordered set of transactions.

More generally, the transaction identifying value may be an arbitrary value set by a master device to distinguish one set of transactions from another set of transactions, or from transactions for which ordering does not need to be enforced. For example, the master device may set the transaction identifying value to one value for a first set of transactions and to another value for a second set of transactions, indicating that transactions within the same set should be handled in the selected order, but transactions from different sets can be reordered with respect to each other.

It may be possible for several master devices to set the same transaction identifying value for different sets of transactions, and it may not be necessary to enforce ordering restrictions between transactions issued by different masters. In this case, to distinguish the sets of transactions issued by the different masters, the transaction tracking circuitry may set the transaction identifying value based on which master device issued the data access transaction as well as the identifying value set by the master devices. For example, the transaction tracking circuitry may append some bits to the transaction identifying value set by the master device with those bits indicating the master device which issued the transaction, to distinguish otherwise identical identifiers set by two different master devices.

The transaction tracking circuitry discussed above may be provided as a separate device to the snoop filter (e.g. on a separate field programmable gate array (FPGA)). The transaction tracking circuitry and snoop filter may later be combined to form an interconnect for an integrated circuit. The transaction tracking circuitry may have a snoop filter interface which interacts with the snoop filter so that, in response to a data access transaction specifying a target address, the snoop filter is looked up to identify which master devices have cached data for the target address. The snoop filter interface then controls issuing of snoop transactions to the identified master devices. Control circuitry for controlling the order in which data access transactions are issued to the slave devices may be reused for also controlling ordering of snoop transactions in a similar way to discussed above.

Figure 1:
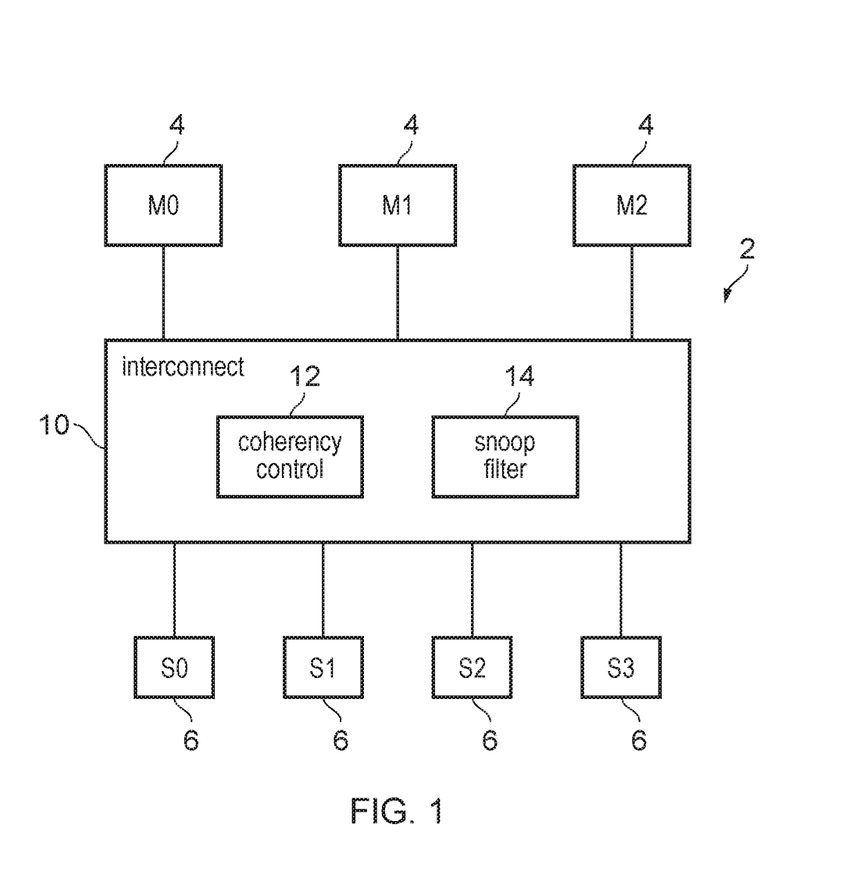
FIG. 1 schematically illustrates an example of an integrated circuit having an interconnect for connecting devices.

FIG. 1 illustrates an example of a data processing apparatus 2 having a number of master devices 4, a number of slave devices 6 and an interconnect 10 for connecting the master devices 4 and slave devices 6. The interconnect 10 receives transactions issued by master devices 4, and controls servicing of the transactions by the slave devices 6 to maintain data coherency.

The master devices 4 may for example include a processor, graphics processing unit, coprocessor or other type of device which can initiate transactions over the interconnect 10. The slave devices 6 may include devices which can respond to data access transactions, such as memory controllers, display controllers, or input/output units for interfacing with peripheral devices such as an Ethernet interface for example. Some devices may sometimes behave as a master device 4 and other times behave as a slave device 6, so that they can both initiate and receive data access transactions.

Some of the master devices 4 may have a cache memory for caching data from main memory. As more than one master device 4 may hold cached data for the same address, the interconnect 10 may manage coherency between the devices 4 so that when one master device 4 initiates a data access transaction to a target address, the interconnect 10 may check whether other devices have that data and ensure that the initiating master device 4 receives the most up to date value. Therefore, coherency control circuitry 12 is provided within the interconnect 10 for managing coherency. For example, the coherency control circuitry 12 may perform various coherency management operations such as hazard detection (for detecting different transactions targeting the same address), ordering enforcement for ensuring that transactions are handled in an order appropriate to the coherency protocol being used, and cache maintenance operations for ensuring that dirty values held by the master devices 4 are written back to memory or invalidated from local caches if necessary.

The interconnect 10 has a snoop filter 14 for tracking which master devices 4 have cached data from a particular address. Without the snoop filter 14, when one master device 4 issues a transaction to a target address, the coherency control circuitry 12 would have to snoop all the other master devices 4 to check whether they are caching the data from the target address. However, as the number of master devices increases, snooping all the other masters becomes expensive. To reduce the number of snoop transactions, the snoop filter 14 may maintain a record of what data is cached by the master devices 4, so that in response to a data access transaction for a target address, the interconnect only needs to snoop the master devices 4 which are recorded in the snoop filter 14 as having cached data for the target address. This improves the performance of the interconnect 10 and reserves bandwidth over the interconnect for data access transactions.

The snoop filter 14 may be an inclusive snoop filter in which all data that is cached by the master devices 4 has a corresponding record in the snoop filter 14 so that it is not possible to miss snooping a device 4 which holds a cache copy of data. However, the snoop filter 14 may permit some inaccuracy in that sometimes the master devices 4 may not signal to the interconnect 10 when they invalidate a data value from their local cache, so the snoop filter 14 may continue to indicate that the master device has valid cached data even if this is incorrect. Therefore, in general an inclusive snoop filter may be a snoop filter 14 which is updated at least in response to data being allocated to a local cache in a master device 4, but does not necessarily need to be updated in response to invalidations from a local cache.

The interconnect 10 may operate according to any coherency protocol. For example, the AMBA ACE coherency protocol provided by ARM Limited of Cambridge, UK may be used.

Figure 2:
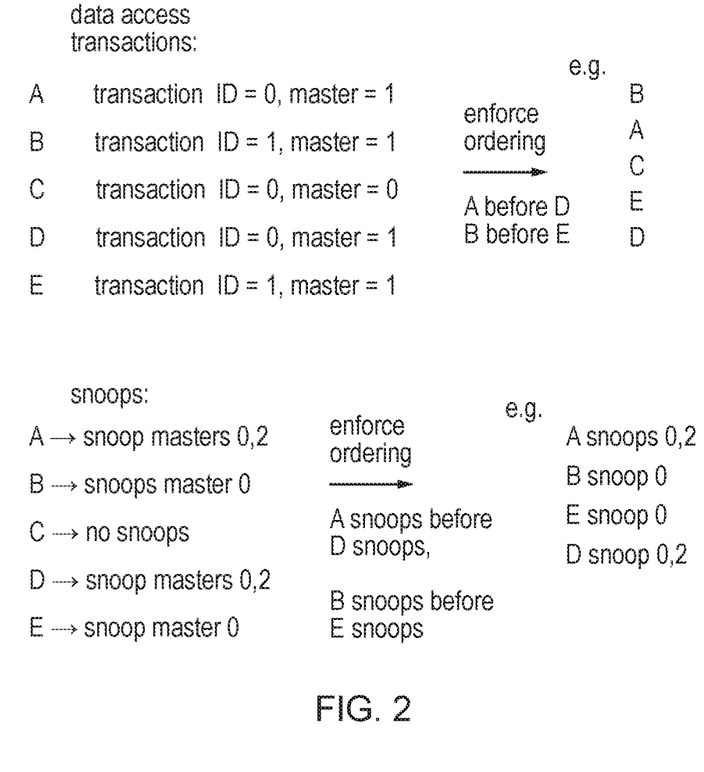
FIG. 2 shows an example of enforcing ordering of data access transactions and their resulting snoop transactions.

As shown in the example of FIG. 2, sometimes it may be useful to define a set of transactions which should be issued to slave devices 6 in the same order as which they were received from master devices 4 by the interconnect 10. The slave devices 6 which receive the transactions may similarly be controlled so they handle the requests they receive in their defined order, without reordering the requests within the same set. Reordering of transactions from different sets with respect to each other may still be permitted. Such order enforcement can be useful for example to avoid deadlocks or other problems which may be caused by cyclic dependencies between transactions. For example, the US patent application US2006/0075169 A1 assigned to ARM Limited of Cambridge, UK provides examples of the types of deadlock which may arise if transaction ordering is not enforced and provides examples of techniques for avoiding these deadlocks.

One technique which may be used for deadlock avoidance may be for each master 4 to define a set of transactions which should be issued by the interconnect to slave devices in the same order they are received. The master device may set a transaction identifier (transaction ID) for each transaction of the set. Multiple sets of transactions can be defined by the master using different identifiers. For example, FIG. 2 shows an example in which five transactions A to E are received by the interconnect 10. As shown in the top part of FIG. 2, the transactions received from the same master device 4 which have the same transaction ID may be constrained to be issued in order to the slave devices 6 by the interconnect 10. For example, transactions A and D were both received from master device 1 and have a transaction ID of 0, and so are considered to be part of the same set. The interconnect 10 ensures that transaction A is issued before transaction D to match the order in which the transactions were received. Similarly, transactions B and E have the same transaction ID of 1 and master ID of 1, and so are issued in the order in which they were received. However, reordering is possible between transactions in different sets, so that for example transaction B may be issued before transaction A which has a different transaction identifier, or transaction C may be reordered freely with respect to the other transactions A, B, D, E because it was transmitted from a different master device.

This ordering enforcement may also apply to snoop transactions. To avoid large reorder buffers within the snoop network, downstream requests and snoop transactions generated from data access transactions having the same transaction identifier from a single master may be issued in the same order as the corresponding set of data access transactions which caused the snoops to be issued. For example as shown in the bottom part of FIG. 2, when transactions A and D trigger snoops to master devices 0 and 2 then it may be ensured that the snoops for transaction A are issued before the snoops for transaction D. Nevertheless, reordering of snoop requests triggered by different set of transactions is allowed (e.g. the snoops triggered by transaction E may be issued ahead of the snoops D).

This ordering enforcement creates potential performance issues when accessing the integrated snoop filter 14. As transactions with the same ID need to be issued in order, it follows that transactions with the same ID should only access any bank of the snoop filter once any same transaction ID has completed the snoop filter access, or a downstream transaction complete in the case of a hit response has been committed for issue on the snoop network for multicast to any relevant higher level caches. This can result in large latencies when switching between different slaves and/or the snoop network and can compound subsequent transactions with different IDs as additional snoop filter access arbitration may been introduced. This will severely limit the available throughput of same ID coherent traffic addressing different snoop filter banks, such as streaming PCIe transactions or memset/memcpy streams.

To overcome this the Snoop Filter/Snoop Network architecture may be accessed out-of-order by any same ID traffic that has also passed the Point-of-Serialisation (responsible for coherency control operations) with associated snoops sent from each bank. However, if the snoop filter 14 has to then track when snoop transactions caused by the out-of-order snoop filter accesses should be issued, then additional large tracking structures would be required in each snoop filter bank to accommodate the snoop issuing capability of the interconnect and the round trip response time from a particular master, e.g. 16 entries per bank. These tracking structures would be required to store not only the ID but also the cacheline address and be capable of handling updates to existing snoop vectors due to evictions and free flowing writebacks required in the ACE protocol. Also, ordering logic and communication interactions between each snoop filter bank would be required to ensure correct same ID issuing into the snoop filter. This would increase latency due to the physical distance required to travel between snoop filter banks. For example, the RAM area for the snoop filter banks is between 50-65% of the total interconnect area, so communication between different banks may be slow.

Figure 3:
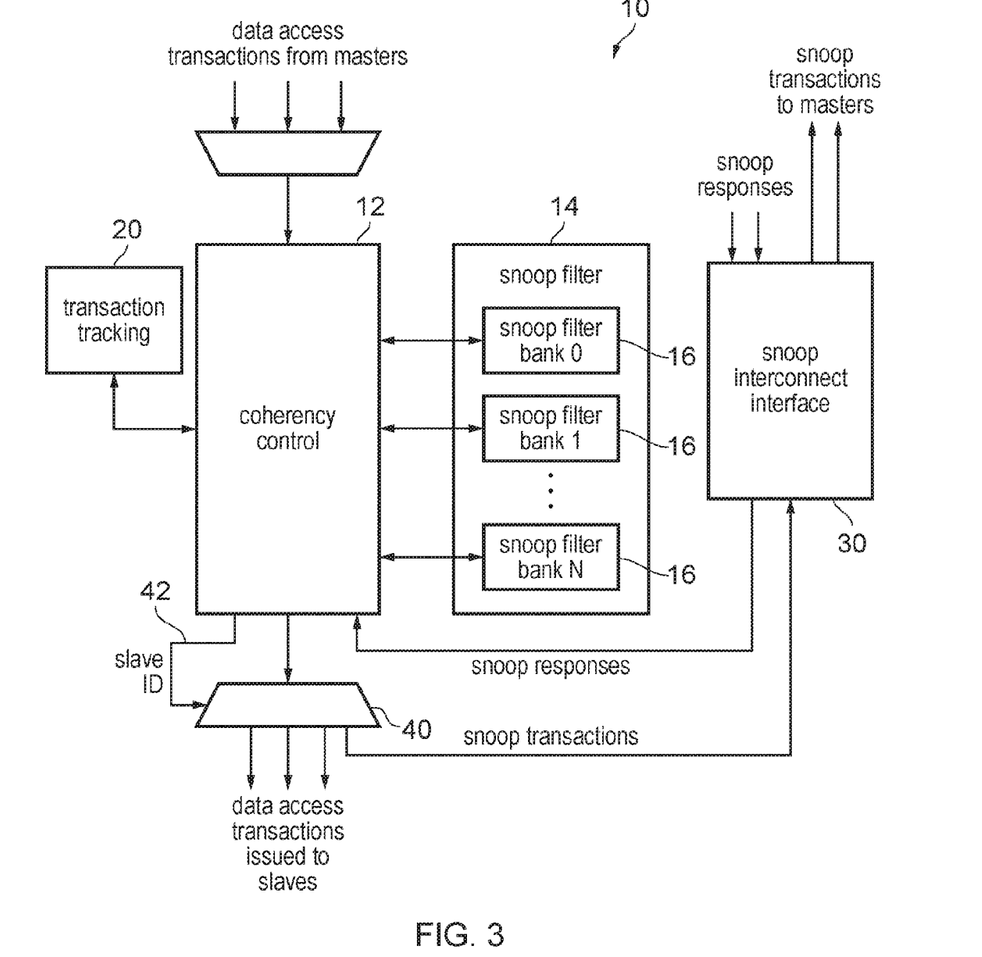
FIG. 3 schematically illustrates an example of a snoop filter and control circuitry within the interconnect.

FIG. 3 shows in more detail the coherency control circuitry 12 and snoop filter 14 of the interconnect 10, which can be used to address these issues. This technique exploits the fact that the coherency control circuitry 12 typically already has transaction tracking circuitry 20 for tracking the ordering of the data access transactions received from the master devices to ensure that the data access transactions within the same set of transactions are issued to slave devices 6 in the order they are received. This transaction tracking circuitry 20 can be reused for also enforcing ordering of snoop transactions triggered by the snoop filter 14. This is very different from known snoop filters which would normally control issuing of the snoop request itself.

As shown in FIG. 3, the snoop filter 14 may include several snoop filter banks 16 which can be looked up in parallel. Each snoop filter bank 16 includes a number of storage locations for storing snoop filter entries. Each snoop filter entry may have a tag portion identifying part or all of a corresponding address, and a data portion identifying which master devices have cached data for the corresponding address. For example, the data portion may comprise a series of bits, with each bit indicating whether or not a corresponding master device has cached the data from the corresponding address. In some cases, an entry in the snoop filter 14 may also indicate other types of information, such as a coherency status of the cached data for example. The snoop filter 14 may have a direct mapped, set-associative or fully-associative structure.

The interconnect 10 has a snoop interconnect interface unit 30 which transmits snoop transactions to the master devices 4 and receives responses to the snoop transactions from the master devices 4. The snoop interconnect interface 30 is coupled to the coherency control circuitry 12 rather than the snoop filter 14. The coherency control circuitry 12 has a slave interface unit 40 for sending data access transactions to slave devices 6. The slave interface unit 40 may be reused for sending snoop transactions to the snoop interconnect interface 30. Hence, the snoop transactions triggered by the snoop filter 14 may essentially be treated as another type of slave transaction and may be assigned a slave device identifier 42 which is different from slave device identifiers identifying the other slave devices 6. In response to the slave device identifier 42 appended to snoop transactions by the coherency control circuitry 12, the slave interface 14 may issue the snoop transactions to the snoop interconnect interface 30.

Hence, the non-coherent transaction tracking and ordering enforcement logic in the transaction tracking circuitry 20 can be reused for handing snoop transactions as well. This can be achieved by essentially treating the snoop network 30 as another distinct master interface that is only accessed if the resulting snoop filter 14 lookup indicates a hit for a given data access transaction in the coherency control circuitry 12. In response to a data access transaction from a master, the coherency control circuitry 12 can look up the target address of the transaction in the snoop filter 14, and a snoop vector is then returned by the snoop filter 14 to indicate which master devices 4 have cached data from the target address. The coherency control circuitry 12 generates snoop transactions to each device indicated in the snoop vector. The transaction tracking circuitry 20 ensures that snoop transactions which have been triggered by data access transactions within the same set of transactions are issued to the snoop interconnect interface 30 in a corresponding order to the order in which the set of data access transactions where received.

By storing the snoop vector in the transaction tracker 20, this allows each snoop filter tracking structure in the snoop filter 14 to be sized to cover the RAM latency required to update existing entries, which reduces area drastically and allows a higher operating frequency. By reusing the non-coherent ordering enforcement in the transaction tracker 20, this enables removal of cross-bank snoop filter communication and ordering structures which allows more freedom of snoop filter banks during implementation and increased operating frequency of each bank.

Figure 4:
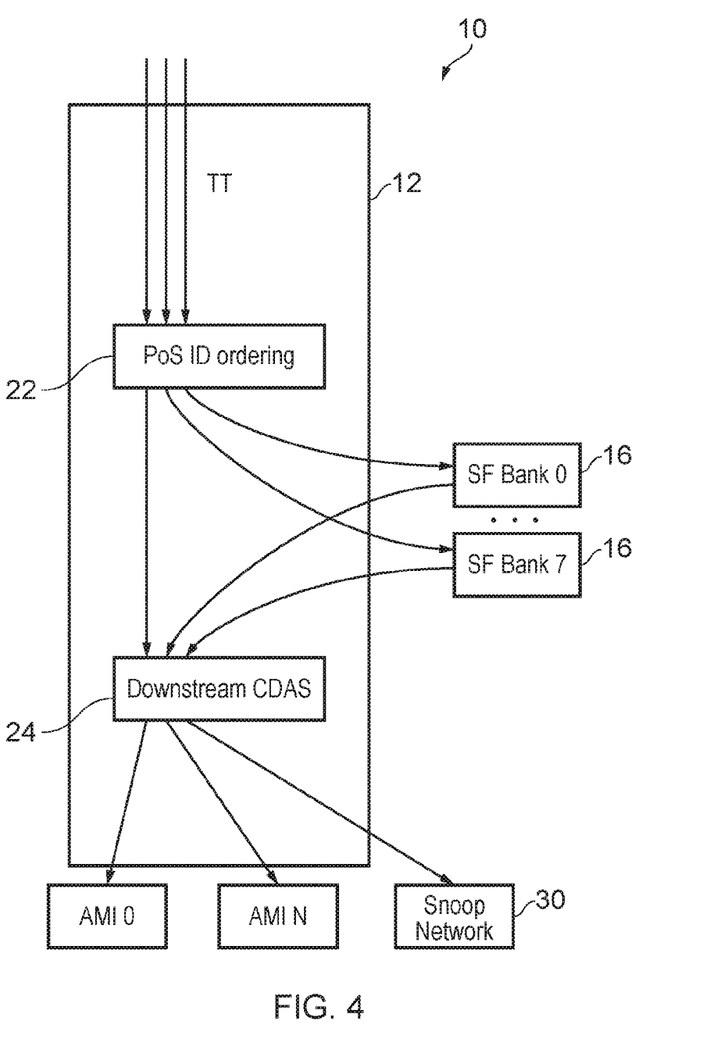
FIG. 4 shows another example of the control circuitry.

FIG. 4 shows another example of the control circuitry 12 of the interconnect 10. In this example the transaction tracking circuitry 20 comprises ID ordering circuitry 22 and cyclic dependency avoidance (CDAS) circuitry 24. When a data access transaction is received from a master device, the ID ordering circuitry 22 appends a master identifier identifying which master sent the transaction to the transaction ID set by the master to produce an overall transaction identifier for the transaction which identifies the set of transactions to which it belongs. This distinguishes transactions having the same ID value set by two different masters. The coherency control circuitry 12 triggers a lookup of the snoop filter banks 16 for the target address of the transaction, and depending on the response received from the snoop filter bank 16, snoop transactions are generated for any master devices which are indicated by the snoop filter 14 as having cached data from the target address. The downstream CDAS circuitry 24 controls issuing of the snoop transactions to the snoop network 30 in an order which corresponds to the order in which transactions from the same set of transactions are received by the interconnect 10. The CDAS circuitry 24 also enforces ordering of data access transactions based on their identifiers set by the ID ordering circuitry 22.

Figure 5:
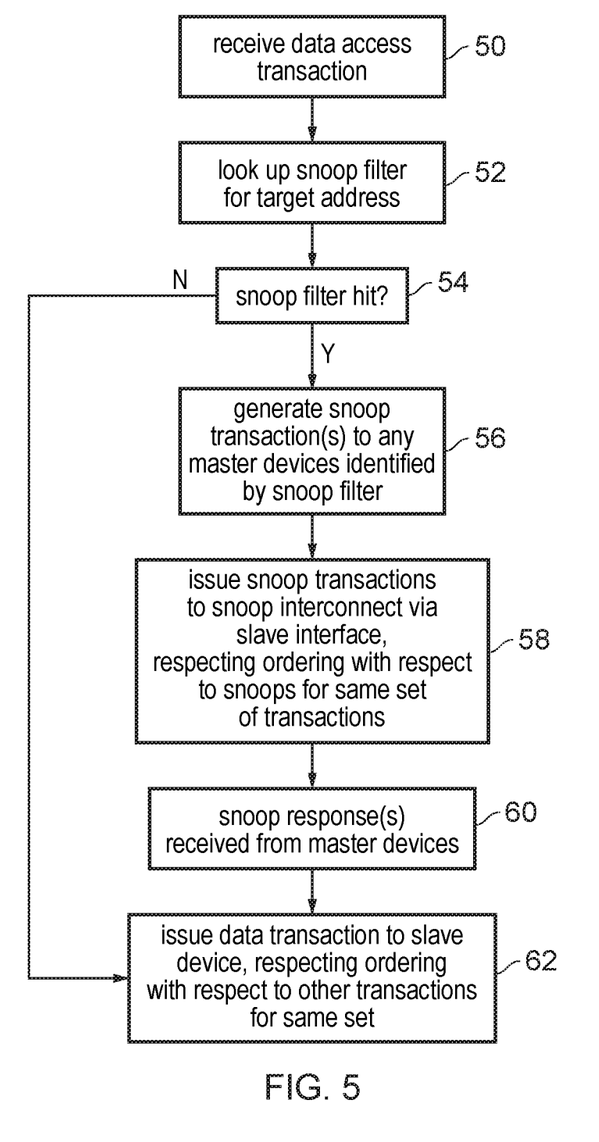
FIG. 5 is a flow diagram illustrating a method of handling data access transactions in the interconnect.

FIG. 5 is a flow diagram showing a method of processing a transaction using the interconnect 10. At step 50, a data access transaction is received from a master device 4 by the interconnect 10. At step 52 the coherency control circuitry 12 looks up the snoop filter for the target address of the data access transaction. The snoop filter 14 determines whether it has a corresponding entry for that address, and returns a hit/miss signal indicating whether or not an entry was present, and if there was a hit then the snoop filter 14 also returns a snoop vector indicating which master devices 4 have cached data for the target address. At step 54, the coherency control circuitry 12 determines whether there was a snoop filter hit based on the hit/miss signal provided by the snoop filter 14. If there was a hit, then at step 56 the coherency control circuitry 12 generates snoop transactions to be sent to any master devices identified by the snoop vector provided by the snoop filter 14. The transaction tracking circuitry 20 tracks the generated snoop transactions and the order in which the data access transactions were received from the master devices and at step 58 controls issuing of the snoop transactions to the snoop interconnect interface 30 so that they are issued in an order which corresponds to the order in which transactions within the same set of transactions were received. Hence, the transaction tracking circuitry 20 ensures that for any pair of transactions within the same set, any snoop transactions triggered by the first transaction in the pair are transmitted to the snoop interconnect interface 30 before any snoop transactions triggered by the second transaction. The slave interface 40 issues the snoop transactions to the snoop interconnect interface 30, which routes them to the respective masters.

At step 60 snoop responses are received from the masters 4. If the snoop responses indicate that there have been any changes to the data cached by the master devices 4, then the coherency control circuitry 12 updates the snoop filter 14 accordingly. Also, the coherency control circuitry 12 determines how the data access transaction which triggered the snoop transactions should be serviced based on the responses. For example, this may require a dirty value from a master device to be written back to memory before the data access transaction specifying the target address can be handled. The particular operations performed for a given data access transaction may depend on which coherency protocol is used. Having received any required snoop responses, and performed any other coherency management operations which are required for the data access transaction, at step 62 the coherency control circuitry 12 issues the data access transaction to the slave device while respecting ordering with respect to other transactions within the same set. The same transaction tracking structure 20 which was used for handling ordering of snoop transactions is also used for the data access transactions which are to be routed to the slaves. If the snoop filter 14 returned a miss signal then steps 56 to 60 are omitted and the method will proceed directly from step 54 to step 62 to issue the data transaction to the slave device.

While FIG. 2 shows an example where transaction identifiers are used to identify sets of data access transactions which are to be handled in the same order in which they are received, other techniques may also be used for specifying orderings for transactions. Also, the present technique can be used for enforcing orderings of data access transactions and snoop transactions other than the ordering based on the order in which the transactions are received at the interconnect.

The coherency control circuitry 12 or the tracking circuitry 20 for the coherency control circuitry may in some cases be provided in a separate device from the snoop filter and/or other parts of the interconnect.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An interconnect for connecting devices in an integrated circuit, the interconnect comprising:
    transaction tracking circuitry capable of tracking data access transactions received by the interconnect from one or more master devices, and for at least one set of data access transactions, controlling issuing of the data access transactions within the same set of data access transactions to one or more slave devices in a selected order; and
    a snoop filter capable of identifying, in response to a data access transaction specifying a target address, which master devices have cached data for the target address;
    wherein the transaction tracking circuitry is capable of controlling issuing of at least one snoop transaction to at least one master device identified by the snoop filter as having cached data for the target address; and
    for a set of snoop transactions issued in response to data access transactions within the same set of data access transactions, the transaction tracking circuitry is capable of controlling issuing of the set of snoop transactions to the at least one master device in an order corresponding to the selected order of the corresponding set of data access transactions.

2. The interconnect according to claim 1, wherein the selected order comprises an order in which the set of data access transactions were received from the one or more master devices.

3. The interconnect according to claim 2, wherein for a set of data access transactions comprising a first data access transaction received before a second data access transaction, the transaction tracking circuitry is capable of controlling the at least one snoop transaction issued in response to the first data access transaction to be issued to the at least one master device before the at least one snoop transaction issued in response to the second data access transaction.

4. The interconnect according to claim 1, wherein the snoop filter comprises a plurality of snoop filter banks; wherein the transaction tracking circuitry is capable of performing parallel lookups of two or more of the plurality of snoop filter banks to identify which master devices have cached data for the target addresses of two or more data access transactions.

5. The interconnect according to claim 1, comprising a snoop interconnect interface capable of issuing the snoop transactions to the at least one master device.

6. The interconnect according to claim 5, comprising at least one slave device interface capable of issuing the data access transactions to the one or more slave devices.

7. The interconnect according to claim 6, wherein the transaction tracking circuitry is capable of issuing the snoop transactions to the snoop interconnect interface via the at least one slave device interface.

8. The interconnect according to claim 7, wherein the at least one slave device interface is capable of selecting a destination slave device for a data access transaction based on a slave device identifier associated with the data access transaction;
    wherein the transaction tracking circuitry is capable of generating the snoop transactions with the slave device identifier set to a predetermined value; and
    in response to the predetermined value of the slave device identifier, the at least one slave device interface is capable of issuing the snoop transactions to the snoop interconnect interface.

9. The interconnect according to claim 7, wherein the at least one slave device interface comprises a dummy slave device interface capable of issuing the snoop transactions to the snoop interconnect interface; and
    the transaction tracking circuitry is capable of issuing the snoop transactions to the dummy slave device interface and issuing the data access transactions to at least one other slave device interface.

10. The interconnect according to claim 1, wherein each data access transaction is associated with a transaction identifying value, and the data access transactions within the same set of data access transactions comprise data access transactions having the same transaction identifying value.

11. The interconnect according to claim 10, wherein the transaction identifying value is set by the master device which issued the data access transaction to the interconnect.

12. The interconnect according to claim 10, wherein the transaction tracking circuitry is capable of setting the transaction identifying value based on which master device issued the data access transaction to the interconnect and an identifying value set by the master device which issued the data access transaction.

13. The interconnect according to claim 2, wherein the transaction tracking circuitry is capable of permitting first and second data access transactions from different sets of data access transactions to be issued to the one or more slave devices in an order which is different to the order in which the first and second data access transactions were received from the one or more master devices.

14. An integrated circuit comprising the interconnect according to claim 1.

15. An interconnect for connecting devices in an integrated circuit, the interconnect comprising:
    transaction tracking means for tracking data access transactions received by the interconnect from one or more master devices, and for at least one set of data access transactions, for controlling issuing of the data access transactions within the same set of data access transactions to one or more slave devices in a selected order; and snoop filter means for identifying, in response to a data access transaction specifying a target address, which master devices have cached data for the target address;

wherein the transaction tracking means is capable of controlling issuing of at least one snoop transaction to at least one master device identified by the snoop filter means as having cached data for the target address; and for a set of snoop transactions issued in response to data access transactions within the same set of data access transactions, the transaction tracking means is capable of controlling issuing of the set of snoop transactions to the at least one master device in an order corresponding to the selected order of the corresponding set of data access transactions.

16. Transaction tracking circuitry for an interconnect for connecting one or more master devices and one or more slave devices in an integrated circuit, the transaction tracking circuitry comprising:

a snoop filter interface capable of controlling a snoop filter, in response to a data access transaction received from a master device specifying a target address, to identify which master devices have cached data for the target address, and capable of controlling issuing of at least one snoop transaction to at least one master device identified by the snoop filter as having cached data for the target address; and control circuitry capable of controlling an order in which the data access transactions are issued to the one or more slave devices;

wherein for at least one set of data access transactions, the control circuitry is capable of controlling issuing of the data access transactions within the same set of data access transactions to the one or more slave devices in a selected order; and for a set of snoop transactions issued in response to data access transactions within the same set of data access transactions, the control circuitry is capable of controlling issuing of the set of snoop transactions to the at least one master device in an order corresponding to the selected order of the corresponding set of data access transactions.

17. An integrated circuit comprising the transaction tracking circuitry according to claim 16.

18. Transaction tracking circuitry for an interconnect for connecting one or more master devices and one or more slave devices in an integrated circuit, the transaction tracking circuitry comprising:

snoop filter interface means for controlling a snoop filter, in response to a data access transaction received from a master device specifying a target address, to identify which master devices have cached data for the target address, and for controlling issuing of at least one snoop transaction to at least one master device identified by the snoop filter as having cached data for the target address; and control means for controlling an order in which the data access transactions are issued to the one or more slave devices;

wherein for at least one set of data access transactions, the control means is capable of controlling issuing of the data access transactions within the same set of data access transactions to the one or more slave devices in a selected order; and for a set of snoop transactions issued in response to data access transactions within the same set of data access transactions, the control means is capable of controlling issuing of the set of snoop transactions to the at least one master device in an order corresponding to the selected order of the corresponding set of data access transactions.

19. A transaction tracking method for an interconnect in an integrated circuit, the method comprising:

receiving data access transactions from one or more master devices of the integrated circuit;

in response to a data access transaction specifying a target address, controlling a snoop filter to identify which master devices have cached data for the target address using a snoop filter;

controlling issuing of at least one snoop transaction to at least one master device identified by the snoop filter as having cached data for the target address; and controlling issuing of the data access transactions to one or more slave devices;

wherein for at least one set of data access transactions, transaction tracking circuitry controls issuing of the data access transactions within the same set of data access transactions to one or more slave devices in a selected order; and the same transaction tracking circuitry controls issuing of a set of snoop transactions issued in response to data access transactions within the same set of data access transactions so that the set of snoop transactions are issued to the at least one master device in an order corresponding to the selected order of the corresponding set of data access transactions.

* * * * *